March 25, 1941.  E. R. ANDERSON  2,236,050
FROZEN PRODUCT AND APPARATUS AND METHOD FOR PRODUCING SAME
Filed Aug. 15, 1938  3 Sheets-Sheet 2

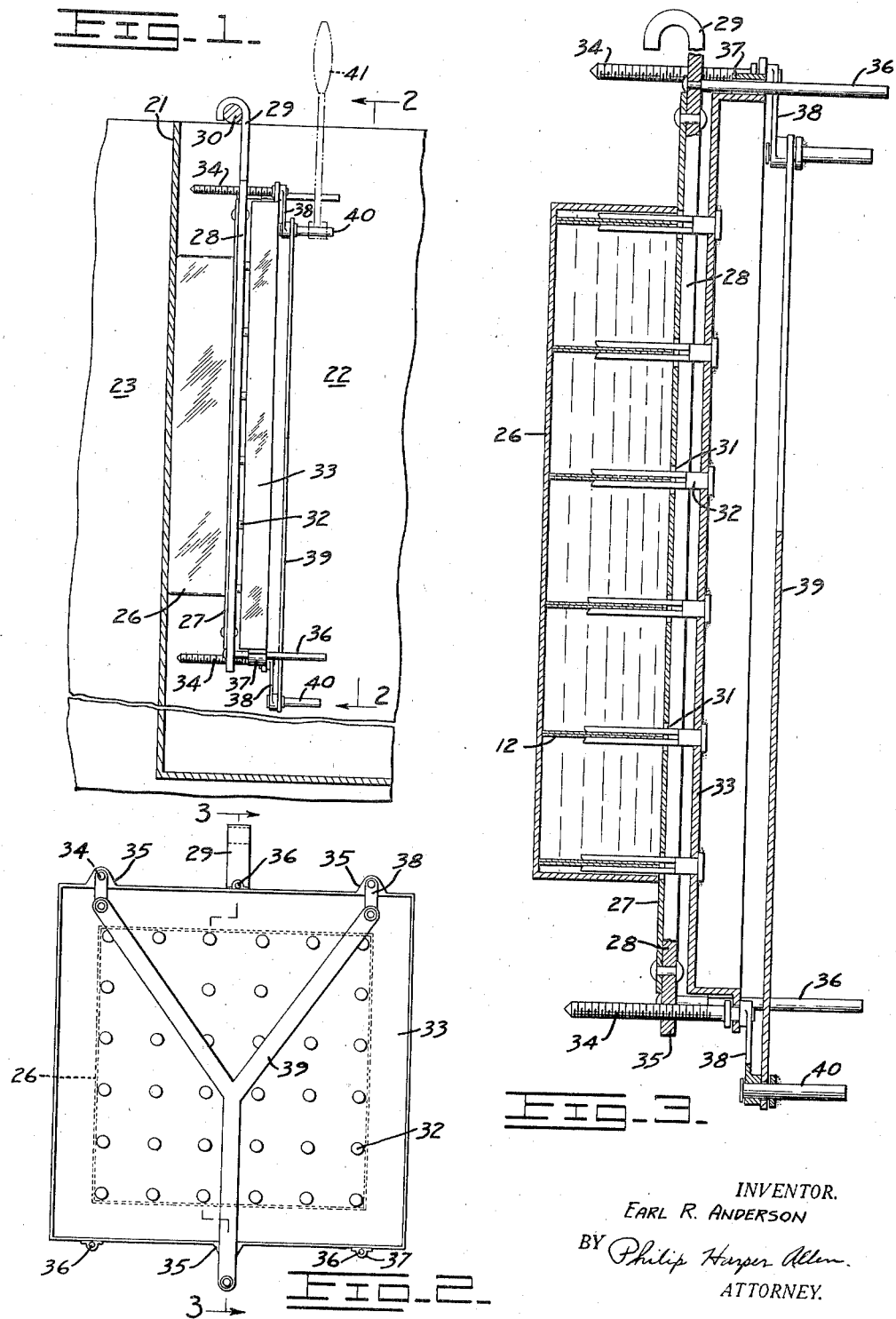

INVENTOR.
EARL R. ANDERSON.
BY Philip Harper Allen
ATTORNEY.

March 25, 1941.   E. R. ANDERSON   2,236,050
FROZEN PRODUCT AND APPARATUS AND METHOD FOR PRODUCING SAME
Filed Aug. 15, 1938   3 Sheets-Sheet 3
FIG-6-
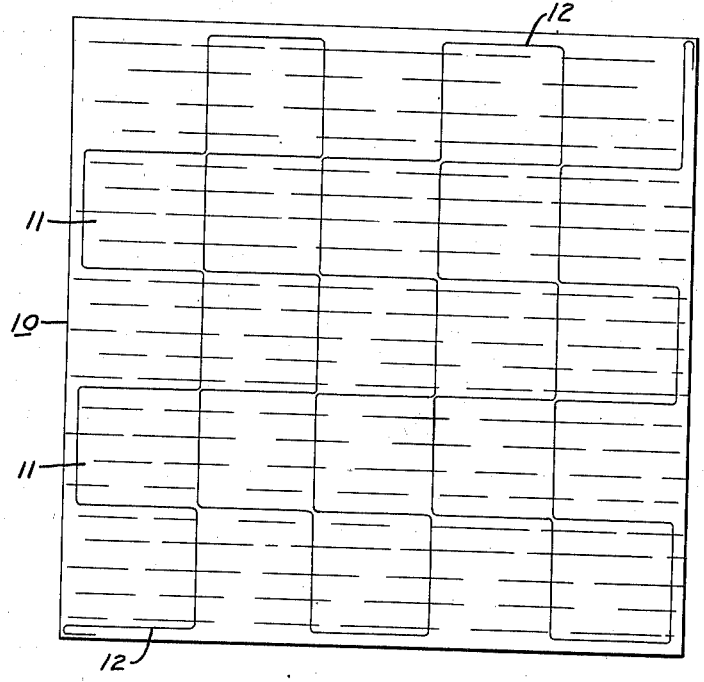
FIG-7-
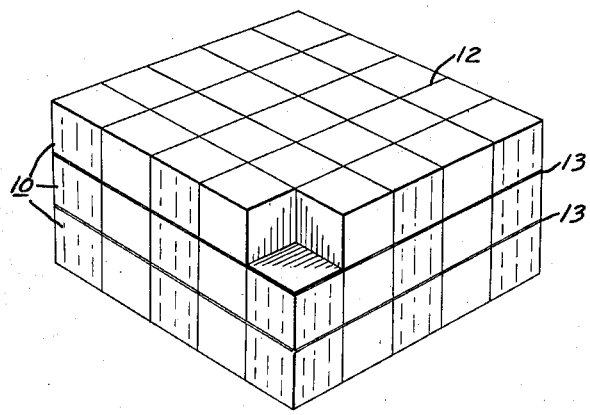
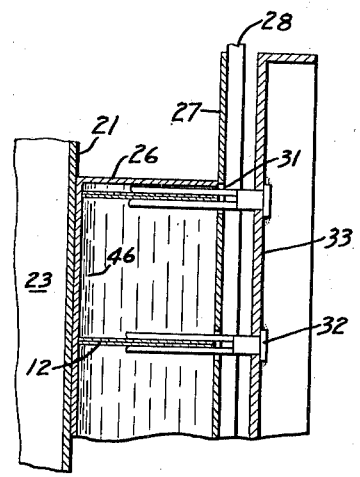
FIG-8-
INVENTOR
EARL R. ANDERSON
BY Philip Harper Allen
ATTORNEY.

Patented Mar. 25, 1941

2,236,050

UNITED STATES PATENT OFFICE 2,236,050

FROZEN PRODUCT AND APPARATUS AND METHOD FOR PRODUCING SAME

Earl R. Anderson, Campbell, Calif.

Application August 15, 1938, Serial No. 224,961

17 Claims. (Cl. 62—163)

This invention relates to the freezing of potable liquids, and is concerned more particularly with the provision of a frozen block of such liquids of an advantageous character and with the provision of improved apparatus and methods for producing the block.

Present commercial production of ice cubes is obtained by freezing in molds or by dividing large cakes of ice (usually 300 lbs. in weight) into cubes by sawing or by the use of hot wires. The result of either method is a mass of ice cubes which must be placed in containers, such as fibre pails or cartons, and must be handled so as to prevent meltage and to prevent freezing together of the cubes. This method of packaging is expensive, and results in melting of the cubes at the corners, so that the product is usually received by the consumer as small portions of ice with rounded corners. Where the dividing method is employed a considerable waste of ice occurs during the dividing operation, and also a considerable proportion of the ice cubes will not be clear but will contain air and solids which are present at the core line in all large blocks of ice manufactured from raw water. The above and other disadvantageous features have resulted in expensive and more or less unsatisfactory commercial production of ice cubes.

The invention disclosed herein is designed to obviate the above-noted difficulties and to provide for economical production of ice cubes or the like of a uniform and satisfactory character, which can be manufactured and sold economically.

It is an object of the invention to provide a frozen block of a potable liquid in which a plurality of individual readily separable units are formed.

Another object of the invention is to provide a block of the character referred to which lends itself to economical volume production and which can be packaged in a sanitary manner so as to be easy to handle for manufacture, storage, transportation, and sale.

Another object of the invention is to provide a block of the character referred to which resists melting, and in which any melting of an exposed surface takes place in an even and uniform manner so that the shape of the block and of the individual units is maintained.

Another object of the invention is to provide improvements in the manufacture of ice cubes and the like.

Another object of the invention is to provide improvements in the manufacture of frozen potables to provide individual separable portions of a desired shape and size.

Another object of the invention is to provide an improved method of freezing blocks of potable liquids to provide individual units within the blocks.

Another object of the invention is to provide an improved method of freezing blocks of potable liquids to provide individul portions which are free of air and suspended solids.

Another object of the invention is to provide an improved freezing apparatus for forming ice cubes or the like in blocks.

Other objects of the invention will appear from the following description thereof, taken in connection with the accompanying drawings, in which:

Fig. 1 is a sectional elevation showing the ice forming apparatus of my invention installed in a freezing can of conventional construction.

Fig. 2 is an elevational view of the freezing apparatus taken as indicated by the line 2—2 in Fig. 1, the view being reduced slightly in size.

Fig. 3 is an enlarged sectional view of the apparatus taken as indicated by the line 3—3 in Fig. 2.

Fig. 6 is a plan view of a frozen block of ice cubes manufactured in accordance with my invention.

Fig. 7 is a perspective view of an unwrapped ice block formed from a plurality of ice blocks of the character shown in Fig. 6.

Fig. 8 is a fragmentary sectional view similar to Fig. 3 showing a preliminary stage of the freezing operation when a thin layer of ice has been formed in the freezing tray.

Figure 4:
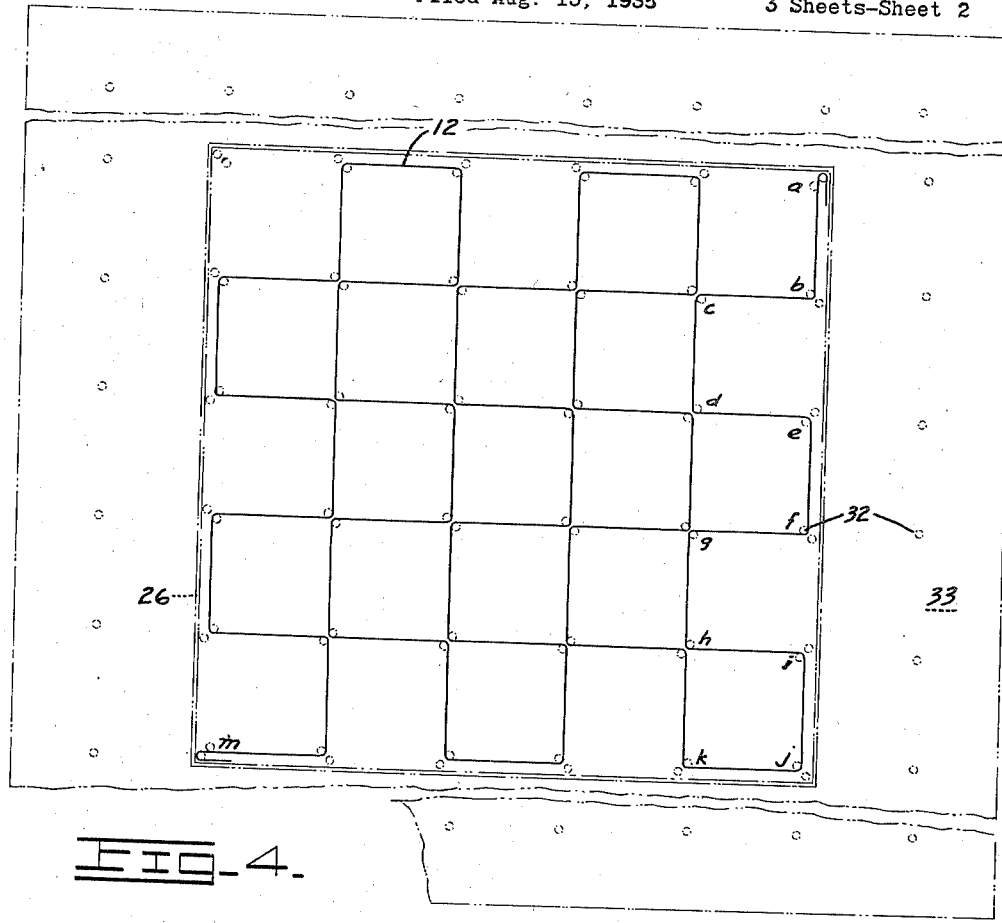
Fig. 4 is a schematic view illustrating one method of installing the cube forming means in the freezing apparatus.

My invention can be employed with various potable liquids such as water, fruit juices and the like to provide individual units of selected size and shape frozen together in a block. However, the invention will be described as employed in the manufacture of ice cubes.

Generally, my invention contemplates the provision of a block layer of individual frozen portions such as ice cubes, in which the individual cubes are separated from each other by a flexible strip of material of a non-self-supporting character, which is flexed into and supported in cellular arrangement until the strip is held in place by the ice cubes to which it is frozen. As shown in Fig. 6, block layer 10 is made up of a plurality of ice cubes 11 separated by a continuous strip of flexible material which is frozen in place to define the respective cubes and provide a frangible bond therebetween, so that the entire block layer forms a rigid unit that can be handled easily. The material is preferably moisture resistant such as light parchment or paraffine-impregnated paper although other similar materials which do not have the structural strength to maintain a desired shape can be used, such as paraffined paper, waxed paper, unwaterproofed paper, "cellophane" and the like, and light cardboard or similar material which has bending lines formed by perforations or the like. While the paper 12 is used preferably in one continuous strip to provide a cellular form having no interlocked or crossing partitions as described more fully hereinafter, the block layer can also be formed by using a plurality of strips if desired. Fig. 7 shows a plurality of block layers 10 separated by sheets or partitions 13 of material similar to the cube separating strip 12, the partitions 13 being frozen between the respective block layers 10 to provide a frangible bond therebetween so that a block of rigid, unitary character is provided. The block may be wrapped in paper or otherwise packaged for storage and sale. The strips 12 and sheet portions 13 are capable of adhering by freezing to ice blocks. Their interposition respectively between individual cube portions 11 and block layers 10 weakens the bonds between the cubes and the layers, the frangibility of the strips and sheets being such as to permit the separation of the cubes and layers individually without substantial destruction of the rest of the block.

In accordance with my novel method of producing the above described block, an ice cube form is prepared of material of a non-self-supporting character by wrapping a strip of the material about spaced form elements having a dimension in the direction of the width of the strip less than such width. The wrapped strip provides partitions forming a cellular structure having a plurality of ice cube forming spaces open at opposite ends. The spacing of the form elements can be selected to obtain the desired shape, and to separate the cube spaces completely or to provide inter-connecting spaces which during freezing provide a path of escape for air and solids.

The form is then placed in the freezing can with the one side edge of the strip in engagement with a freezing surface so that the surface closes the cube spaces at one end. The width of the freezing can is greater than the depth of the block form and the outer edge of the form is left open or in communication with the free water in the can. In this way the water in the form will freeze progressively from one side and form clear ice which is free of air and solid matter suspended in the water.

The freezing operation is then started and continues until the edge of the flexible cube forming strip contacting the freezing surface has become attached to such surface by a layer of ice of a thickness to hold the strip in its cellular arrangement without engaging the form elements in the ice layer. The form elements are then withdrawn either in one operation or in step by step fashion so that the flexible cube forming strip is held in place by the layer of ice formed in the initial freezing step. Subsequently, the freezing is continued until the complete thickness of the ice cubes is frozen so that the flexible cube forming strip is frozen into the block and provides a frangible bond between adjacent ice cubes. If desired, the form elements can be left in place during the entire freezing operation, and subsequently heated and removed. The freezing operation performed in the above manner can be carried out either with or without air agitation of the water, and even without air agitation substantially clear ice cubes will be obtained which are free of solids in solution or suspended in the water. The above general description of the method will be amplified in connection with the description of the apparatus and its use in carrying out the method.

Referring to Fig. 1, a fragmentary portion of a freezing can of conventional construction is shown comprising wall 21 having water chamber 22 formed therein and surrounded by a brine tank 23 of the usual character. The apparatus of my invention comprises generally a freezing tray for receiving the flexible strip which is disposed in cellular arrangement on a block form support. The support maintains the arrangement of the cube forming partitions of the strip in the tray during the initial step of the freezing operation, and means is provided for withdrawing the form support after a preliminary part of the freezing operation is performed. In this manner the first part of the ice frozen holds the form in place during the remainder of the freezing operation.

Referring to Figs. 1 to 3, the apparatus comprises pan or tray 26 which is adapted to be placed with its open side in abutting relation with a block form support comprising perforated supporting plate 27 mounted on rectangular frame 28. Hook extension 29 is provided on frame 28 for engagement with bar 30 on can 21 to support the apparatus in the can. Usually, a plurality of frames 28 will be suspended in engagement with the various walls of the can, although for purposes of illustration only one is shown.

Holes 31 in plate 27 are regularly arranged to receive the form supporting elements comprising pairs of spaced apart pins 32 which are suitably secured on pin plate 33 and serve to support the block form strip as described hereinafter.

Pin plate 33 is connected for adjusting movement relative to supporting plate 27 and for this purpose has journalled therein a plurality of adjusting screws 34 which have threaded engagement with corresponding ears 35 on frame 28. The inward and outward movement of pin plate 33 with respect to supporting plate 27 may also be guided if desired by guide pins 36 secured on frame 28 and extending through suitable aligned bosses 37 carried by pin plate 33. Adjusting screws 34 have respective crank arms 38 interconnected for simultaneous movement by triangular linkage 39 carrying pins 40 journalled in crank arms 38. By rotating screws 34, pin plate 33 can be moved relative to plate 27 to determine how far pins 32 project through corresponding holes 31 in supporting plate 27. Detachable operating handle 41 (Fig. 1) may be provided for engagement with one of pins 40.

With the apparatus assembled as shown in Fig. 3, it will be seen that rotation of arms 38 through linkage 39 will cause movement of pin plate 33 inwardly and outwardly with respect to supporting plate 27 so that the extent of projection of pins 32 into the ice cube space for engagement with the strip 12 can be varied.

As described above, flexible strip 12 is installed on the pins 32 with one side edge in engagement with plate 27 to provide the cellular block form preliminary to the freezing operation. Preferably the strip 12 is continuous and may be installed on pins 32 as shown in Fig. 4 beginning at $a$ and extending around the successive pairs of pins 32 of the first two adjacent rows indicated at $b$ to $k$. The strip is then wound on the other rows of pins as shown to end at $m$ and to provide a cellular arrangement of the desired size. As seen in Fig. 4 the respective pairs of pins 32 are arranged diagonally with respect to the strip to provide for even similar cube spaces. In this manner the entire block form is completed to form a cellular arrangement with the adjacent corners of the strip 12 spaced closely together to separate the cube spaces.

With the block form in place on pins 32, tray 26 of a selected size is placed thereon as shown in Fig. 3 and the entire apparatus placed in the freezing can as shown in Fig. 1 with tray 26 in engagement with a wall of the can to provide a freezing surface. Although the block form may be employed directly against the can I prefer to employ a tray as shown. It will be understood that the tray 26 can be varied in size, and that one or more trays (see Fig. 5) can be used with each frame, if desired. As the freezing operation begins, the tray 26 becomes frozen to the wall of can 21 and in a short time a thin layer of ice is formed in the tray, to a thickness 46 (Fig. 8) for example, so that the flexible strip of the block form has its tray engaging edge frozen in place. At this time, the withdrawal of pins 32 may be effected by operating handle 41, and the pins can either be withdrawn entirely in one operation or in stages as the thickness of the ice increases.

During the freezing operation, the impurities in the water, together with any air, tend to progress toward the center of the freezing can, particularly if air agitation of the water is employed, so that any impurities of the water in tray 26 will be forced outwardly through the openings 31 and clear ice cubes within the tray will result. When the freezing operation is completed, the tray 26 is broken loose and removed from the can 21. The entire ice cube block can be thawed loose from the tray and the perforated plate, and placed in a cold storage chamber for subsequent packaging and sale. The ice formed in apertures 31 will melt when the plate 27 is thawed loose so that an even block surface is provided. If the tray 26 is smaller than the outer rows of pins 32 as shown in Fig. 4, the block layer 10 (Fig. 6) will require trimming to provide a block of the character shown in Fig. 7.

If desired, the paper strip 12 may be wound around its forming elements to provide restricted connecting spaces between adjacent ice cube cells so that the ice cubes when frozen have connecting portions. When this type of block layer is desired the pins 32 as shown in Fig. 4 are replaced by more widely spaced pins 47 (Fig. 5) which may have flat paper engaging faces. The paper strip is wound about the pins in a continuous fashion to provide a connecting portion 48 between adjacent cells, so that the connecting portions extend in diagonal rows through the block layer. To obtain this type of ice block the flexible strip 12 may be started as at A and wound in diagonal fashion about successive pins 47 from B to T, etc., as indicated. During the freezing operation each inter-connected diagonally extending row of cube cells provides a free passage for escape of air to the upper wall of the freezing tray where it will pass laterally outward so that it will not be frozen in the cubes. In the frozen block layer the connecting ice portions provide additional strength while they are not of sufficient size to interfere with breaking apart of the cubes. It will be seen also that Fig. 5 illustrates the formation of a plurality of block layers on one frame, and that the trays match the outline of the pins so that the block layers formed will not require trimming.

Figure 5:
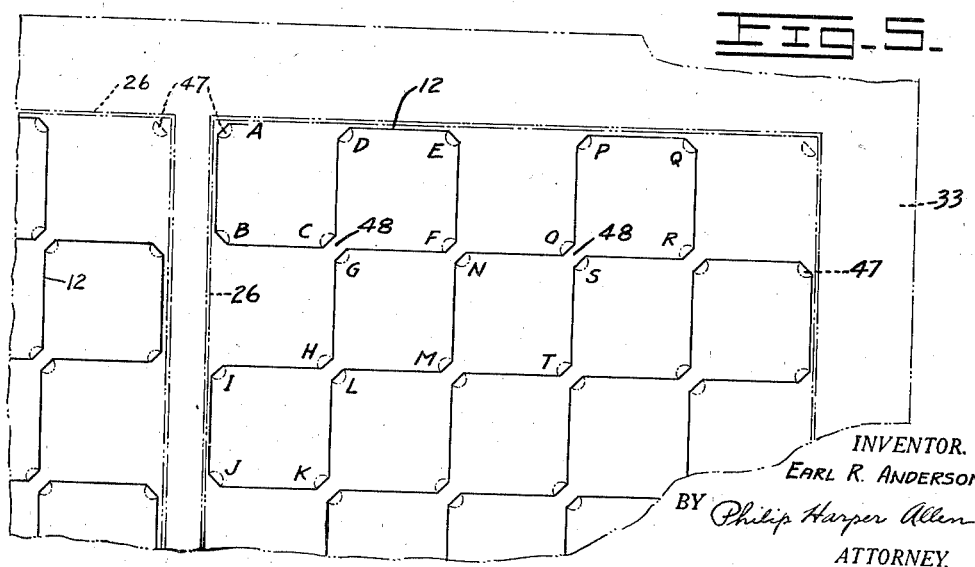
Fig. 5 is a fragmentary schematic view similar to Fig. 4 showing a different method of installing the cube forming means.

Figures 4 and 5 show, by way of example, two specifically different dispositions of the strip means 12 throughout the block. The extent of the strip means is generally sinuous in both examples.

From the above description it is seen that I have provided for economical and efficient production of frozen liquids in individual portions, and that the invention is especially applicable to the provision of individual ice portions such as "ice cubes." Although the embodiment disclosed relates specifically to the manufacture of ice portions in cube form, it is to be understood that the form and size can be varied, and that the invention can be employed with all forms of potable liquids when it is desired to freeze the same to provide individual portions. The scope of my invention, therefore, should be limited only by the scope of the claims appended hereto.

I, therefore, claim as my invention:

1. A frozen liquid product comprising a layer of individual frozen portions having a continuous flexible separating strip embedded therein in cellular arrangement to define said portions, said cellular arrangement being formed by bending said strip to form sections having adjacent corners, said corners being spaced apart to provide narrow connections of frozen liquid between adjacent portions.

2. The method of forming a block of individual portions of frozen liquid, which comprises preparing a form defining portions of the desired size and shape, supporting the form in the liquid with a face of the form adjacent a freezing surface which the liquid contacts, freezing the form to the surface, withdrawing the support from the form, and completing the freezing operation.

3. The method of forming a block of individual portions of frozen liquid, which comprises supporting a form defining portions of the desired size and shape in the liquid with a face of the form against a freezing surface which the liquid contacts, freezing the form to the surface, withdrawing the support from the form, and completing the freezing operation.

4. The method of forming a block of individual portions of frozen liquid, which comprises preparing a form by supporting a flexible partition strip in cellular arrangement, placing the form in the liquid with one edge of the strip in engagement with a freezing surface, and freezing a layer of liquid on said freezing surface so that the layer supports the form on the surface and maintains the cellular arrangement of the strip.

5. The method of forming a block of individual portions of frozen liquid, which comprises supporting a flexible partition strip in cellular arrangement in the liquid with one edge of the strip in engagement with a freezing surface, effecting a preliminary freezing step so that a layer of frozen liquid supports the form on the surface and maintains the cellular arrangement of the strip, withdrawing the support of the form, and completing the freezing operation.

6. The method of forming a block of individual portions of frozen liquid, which comprises preparing a form by winding a flexible partition strip about supporting elements to define a cellular arrangement with the supporting elements overlapping one edge of the strip, supporting the form on the elements in the liquid with the other edge of the strip engaging a freezing surface, and withdrawing the supporting elements after formation of a frozen layer of a thickness to maintain the cellular arrangement of the strip without engaging the supporting elements.

7. The method of forming a block of individual portions of frozen liquid, which comprises preparing a cellular form having the opposite ends of the cells open, supporting the form in a liquid with one side of the form against a freezing surface which closes similar ends of the cells and with the other ends of the cells open to permit the escape of air and suspended solids from the form, freezing the form to said surface and continuing the freezing operation until the frozen layer extends from the side of form engaged with the freezing surface to the opposite side.

8. In a freezing apparatus, a freezing surface, a supporting frame mounted in spaced parallel relation to said surface, means for supporting a form between said surface and said frame, and means for withdrawing said supporting means relative to the form.

9. In a freezing apparatus, a freezing surface, an apertured supporting frame mounted in spaced parallel relation to said surface, means projecting through said frame for supporting a form between said surface and said frame, and means for withdrawing said supporting means relative to the form.

10. In a freezing apparatus, a liquid can having a vertically disposed freezing surface, a supporting frame mounted in spaced parallel relation to said surface, means for supporting a form between said surface and said frame, means for withdrawing said supporting means relative to the form, and operating means for said withdrawing means extending above the liquid level in said can.

11. In a freezing apparatus, a freezing surface, an apertured frame mounted in spaced parallel relation to said surface, an array of form supporting pins projecting through said frame for supporting a form between said surface and said frame, and means for withdrawing said array of pins.

12. In a freezing apparatus, a frame, an array of form strip supporting elements cooperatively related to said frame to support a form strip in cellular arrangement thereon, and means mounting said supporting elements for inward and outward movement relative to said frame to effect adjustment thereof to and from form strip supporting position.

13. A frozen liquid product comprising a self-sustaining block made up of individual portions each frozen to the rest of the block by bonds weakened by the interposition of thin flexible strip means extending sinuously throughout the block and being of such character as to adhere by freezing to ice and of such frangibility as to permit the separation of portions individually but without substantial destruction of the rest of the block.

14. A frozen liquid product comprising a self-sustaining assembly of a plurality of layers, each layer comprising a self-sustaining block made up of individual portions each frozen to the rest of the block by bonds weakened by the interposition of thin flexible strip means extending sinuously throughout the block and being of such character as to adhere by freezing to ice and of such frangibility as to permit the separation of portions individually but without substantial destruction of the rest of the block, adjacent layers of said assembly being held together by bonds weakened by the interposition of thin flexible sheet means of such character as to adhere by freezing to an ice block.

15. A frozen liquid product comprising a self-sustaining block made up of individual cellular portions each frozen to the rest of the block by bonds weakened by the interposition of thin flexible strip means extending sinuously throughout the block and being of such character as to adhere by freezing to ice and of such frangibility as to permit the separation of portions individually but without substantial destruction of the rest of the block.

16. A frozen liquid product comprising a self-sustaining block made up of individual portions each frozen to the rest of the block by bonds weakened by the interposition of thin non-self-supporting flexible strip means extending sinuously throughout the block and being of such character as to adhere by freezing to ice and of such frangibility as to permit the separation of portions individually but without substantial destruction of the rest of the block.

17. A frozen liquid product comprising a self-sustaining block made up of individual portions each frozen to the rest of the block by bonds weakened by the interposition of unitary continuous thin flexible strip means extending sinuously throughout the block and being of such character as to adhere by freezing to ice and of such frangibility as to permit the separation of portions individually but without substantial destruction of the rest of the block.

EARL R. ANDERSON.